UNITED STATES PATENT OFFICE.

EDWIN CUNO KAYSER, OF BEAU SÉJOUR, ST. BRELADE'S BAY, ISLE OF JERSEY, ASSIGNOR, BY MESNE ASSIGNMENTS, TO THE HYDROGENATION COMPANY, OF CINCINNATI, OHIO, A CORPORATION OF OHIO.

PROCESS FOR EFFECTING REDUCTION OF FATTY OR OTHER ORGANIC COMPOUNDS.

1,134,746. Specification of Letters Patent. Patented Apr. 6, 1915.

No Drawing. Application filed October 30, 1912. Serial No. 728,675.

*To all whom it may concern:*

Be it known that I, EDWIN CUNO KAYSER, a subject of the King of Great Britain, and a resident of Beau Séjour, St. Brelade's Bay, Isle of Jersey, have invented a certain new and useful Process for Effecting Reduction of Fatty or other Organic Compounds, of which the following is a specification.

It is well known that "unsaturated" fatty acids, their glycerids or other esters, hereinafter collectively referred to as unsaturated fatty-acid compounds, can be "hydrogenized"—that is, made to chemically absorb hydrogen—and that other organic compounds, such as nitrobodies, can be "reduced" to amido or corresponding compounds, when these various materials are severally submitted to the action of gaseous hydrogen in presence of metallic catalyzers, such as finely divided nickel.

It is also known that another class of organic bodies undergoes changes with elimination of hydrogen, when merely heated with the metallic catalyzers just referred to, as witness the transformation of a borneol, as borneol or iso-borneol into camphor, as shown in Patent No. 994,437, of June 6, 1911, for the transformation of borneol into camphor.

The purpose of the present invention is to facilitate "hydrogenation" of said fatty or of other organic bodies and "reduction" in general; and moreover to avoid the necessity of producing and handling gaseous hydrogen, and such purpose is achieved by heating, in presence of a metallic catalyzer, such bodies with others, capable of evolving hydrogen under prevailing conditions.

For example, in order to convert triolein into tristearin, a mixture thereof with borneol—in the proportion of one molecule of the former to three molecules of the latter—is heated in presence of a small percentage of catalytic nickel-powder, the charge being kept in a lively state of agitation. When the reaction is terminated, the catalyzer is removed by filtration or settling, whereupon the generated stearin can be freed from simultaneously formed camphor in a current of steam. The cycle of reaction, taking place in a parallel and continuous manner, may, as far as the essential conversion of constituent oleic into stearic acid is concerned, be expressed by the following formulæ:

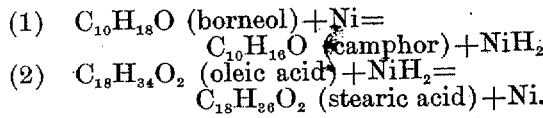

(1) $C_{10}H_{18}O$ (borneol) $+ Ni =$
$C_{10}H_{16}O$ (camphor) $+ NiH_2$ (2) $C_{18}H_{34}O_2$ (oleic acid) $+ NiH_2 =$
$C_{18}H_{36}O_2$ (stearic acid) $+ Ni$.

While the two classes of bodies, thus reacting, should always meet in proportions corresponding with their mutual capacity to "give" and "take" hydrogen, the supply of the latter may be purposely limited, in order to restrict the extent or intensity of such reaction.

For example, for the complete saturation of one molecule of linoleic acid $C_{18}H_{32}O_2$ and its consequent transformation into stearic acid $C_{18}H_{36}O_2$, no less than two molecules of borneol, or a corresponding amount of other equivalent body, would suffice; with half that quantity of hydrogen conveyer, under otherwise suitable conditions, the reaction might nevertheless be carried as far as the oleic acid $C_{18}H_{34}O_2$ stage. Similarly, the hydrogen-supply might be purposely restricted, in order to "reduce" or "saturate" but one constituent of a mixture, such as a natural oil.

While throughout the reaction the hydrogen-recipient should, in conjunction with the catalyzer, be present in adequate quantity, the body furnishing the hydrogen may be introduced gradually and as convenient; should such body be volatile at the temperature demanded for the reaction, it may at once be employed as vapor.

The reaction may also be carried out in a common neutral solvent, particularly when dealing with bodies which will not mix readily.

The nature and proportion of the catalyzer, the temperature and duration of reaction, most suited in each separate case, have to be empirically ascertained.

I claim:

1. The process of hydrogenizing organic bodies, which consists in heating the same in presence of a metallic catalyzer, with due proportions of organic bodies capable of liberating hydrogen on contact with such catalyzer, under conditions to effect a transfer of hydrogen between said organic bodies.

2. The process of hydrogenizing unsaturated fatty-acid compounds, which consists in heating such fatty-acid compounds in presence of a metallic catalyzer with an adequate amount of such other organic body as will be induced by said catalyzer to liberate hydrogen.

3. The process of hydrogenizing unsaturated fatty-acid compounds, which consists in heating the fatty compounds in due proportion, and in presence of finely divided catalytic nickel, with a borneol.

EDWIN CUNO KAYSER.

Attest:
MARSTON ALLEN,
HELEN L. AICHHOLZ.

It is hereby certified that in Letters Patent No. 1,134,746, granted April 6, 1915, upon the application of Edwin Cuno Kayser, of Beau Séjour, St. Brelade's Bay, Isle of Jersey, for an improvement in "Processes for Effecting Reduction of Fatty or Other Organic Compounds," an error appears in the printed specification requiring correction as follows: Page 2, line 9, claim 3, after the word "fatty" insert the word *acid;* and that the said Letters Patent should be read with this correction therein that the same may conform to the record of the case in the Patent Office.

Signed and sealed this 12th day of October, A. D., 1915.

[SEAL.]

R. F. WHITEHEAD,
*Acting Commissioner of Patents.*

Cl. 87—12.